United States Patent
Lewis et al.

(10) Patent No.: US 7,505,906 B2
(45) Date of Patent: Mar. 17, 2009

(54) SYSTEM AND METHOD FOR AUGMENTING SPOKEN LANGUAGE UNDERSTANDING BY CORRECTING COMMON ERRORS IN LINGUISTIC PERFORMANCE

(75) Inventors: Steven H. Lewis, Middletown, NJ (US); Kenneth H. Rosen, Middletown, NJ (US)

(73) Assignee: AT&T Intellectual Property, II, New York, NY (US)

( * ) Notice: Subject to any disclaimer, the term of this patent is extended or adjusted under 35 U.S.C. 154(b) by 807 days.

(21) Appl. No.: 10/787,782

(22) Filed: Feb. 26, 2004

(65) Prior Publication Data
US 2005/0192801 A1 Sep. 1, 2005

(51) Int. Cl.
*G10L 15/00* (2006.01)

(52) U.S. Cl. .............. 704/246; 704/250; 704/257

(58) Field of Classification Search .......... 704/246, 704/257, 250
See application file for complete search history.

(56) References Cited

U.S. PATENT DOCUMENTS

| | | | |
|---|---|---|---|
| 5,261,112 A | | 11/1993 | Futatsugi et al. |
| 5,799,269 A | * | 8/1998 | Schabes et al. ............... 704/9 |
| 5,855,000 A | | 12/1998 | Waibel et al. |
| 5,903,864 A | * | 5/1999 | Gadbois et al. ............ 704/251 |
| 5,999,896 A | * | 12/1999 | Richardson et al. ............ 704/9 |
| 6,195,634 B1 | * | 2/2001 | Dudemaine et al. ......... 704/231 |
| 6,598,017 B1 | * | 7/2003 | Yamamoto et al. .......... 704/251 |
| 7,117,153 B2 | * | 10/2006 | Mahajan et al. ............. 704/236 |
| 7,216,079 B1 | * | 5/2007 | Barnard et al. .............. 704/244 |
| 2003/0225579 A1 | | 12/2003 | Wang et al. |
| 2003/0229497 A1 | * | 12/2003 | Wilson et al. ............ 704/270.1 |
| 2004/0102971 A1 | * | 5/2004 | Lipscher et al. ............. 704/236 |

FOREIGN PATENT DOCUMENTS

WO   WO 2004/015543 A2   2/2004

OTHER PUBLICATIONS

Predicting Spoken Disfluencies During Human-Computer Interaction, Sharon Oviatt, Department of Computer Science and Engineering, Oregon Graduate Institute of Science and Technology, Portland, Oregon, Sep. 26, 1975.
Morris M S et al: "SLIPS: a database system for computer storage and analysis of phonological errors" Proceedings of the Seventh Annual Symposium on Computer Applications in Medical Care IEEE Comput. Soc. Press Silver Spring, MD, USA, 1984, pp. 738-741, XP002433502.

* cited by examiner

*Primary Examiner*—Daniel D Abebe

(57) ABSTRACT

A method and system for automatic speech recognition are disclosed. The method comprises receiving speech from a user, the speech including at least one speech error, increasing the probabilities of closely related words to the at least one speech error and processing the received speech using the increased probabilities. A corpora of data having common words that are mis-stated is used to identify and increase the probabilities of related words. The method applies to at least the automatic speech recognition module and the spoken language understanding module.

5 Claims, 1 Drawing Sheet

SYSTEM AND METHOD FOR AUGMENTING SPOKEN LANGUAGE UNDERSTANDING BY CORRECTING COMMON ERRORS IN LINGUISTIC PERFORMANCE

BACKGROUND OF THE INVENTION

1. Field of the Invention

The present invention relates to spoken dialog systems and more specifically to a system and method of augmenting spoken language recognition and understanding by correcting common errors in linguistic performance.

2. Introduction

Spoken dialog systems have several main components or modules to process information in the form of speech from a user and generate an appropriate, conversational response. FIG. 1 illustrates the basic components of a spoken dialog system 100. The spoken dialog system 100 may operate on a single computing device or on a distributed computer network. The system 100 receives speech sounds from a user 102 and operates to generate a response. The general components of such a system include an automatic speech recognition ("ASR") module 104 that recognizes the words spoken by the user 102. AT&T's Watson ASR component is an illustration of this module. A spoken language understanding ("SLU") module 106 associates a meaning to the words received from the ASR module 104. A dialog management ("DM") module 108 manages the dialog by determining an appropriate response to the customer question. AT&T's Florence DM engine is an example of this module. Based on the determined action, a spoken language generation ("SLG") module 110 generates the appropriate words to be spoken by the system in response and a Text-to-Speech ("TTS") module 112 synthesizes the speech for the user 102. AT&T's Natural Voices TTS engine provides an example of the TTS module. Data and rules 114 are used to train each module and to process runtime data in each module.

A key component in achieving wide-spread acceptance of interactive spoken dialog services is achieving a sufficiently high a percentage correct interpretations of requests spoken by callers. Typically, the ASR module 104 uses statistical models of acoustic information to recognize patterns as semantic units such as words and phrases. The patterns are typically matched against large or specialized dictionaries of words that are found in general or restricted contexts. In general, the smaller the set of accepted target words the greater the recognition accuracy.

However, a common problem arises when the speaker or user of the system does not speak in a fluent manner. For example, the user may say "I . . . um . . . um . . . am interested in . . . ah . . . my checking . . . I mean savings . . . account balance." What is needed in the art is an approach to correctly recognizing and understanding what a caller means to say when the caller has said something different than what this caller intended because of disfluencies, or slips of the tongue.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The embodiments of the invention comprise a method, software module, and spoken dialog system for performing automatic speech recognition and spoken language understanding. The method comprises receiving speech from a user, the speech including at least one speech error, modifying the probabilities of closely related words to the at least one speech error and processing the received speech using the modified probabilities. A corpora of data is used to identify words that are commonly mis-stated so that when the at least one speech error is received, related words to the at least one speech error may have their probabilities modified when speech recognition occurs or language understanding occurs. This increases the likelihood that the correct word will be interpreted.

BRIEF DESCRIPTION OF THE DRAWINGS

In order to describe the manner in which the above-recited and other advantages and features of the invention can be obtained, a more particular description of the invention briefly described above will be rendered with reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
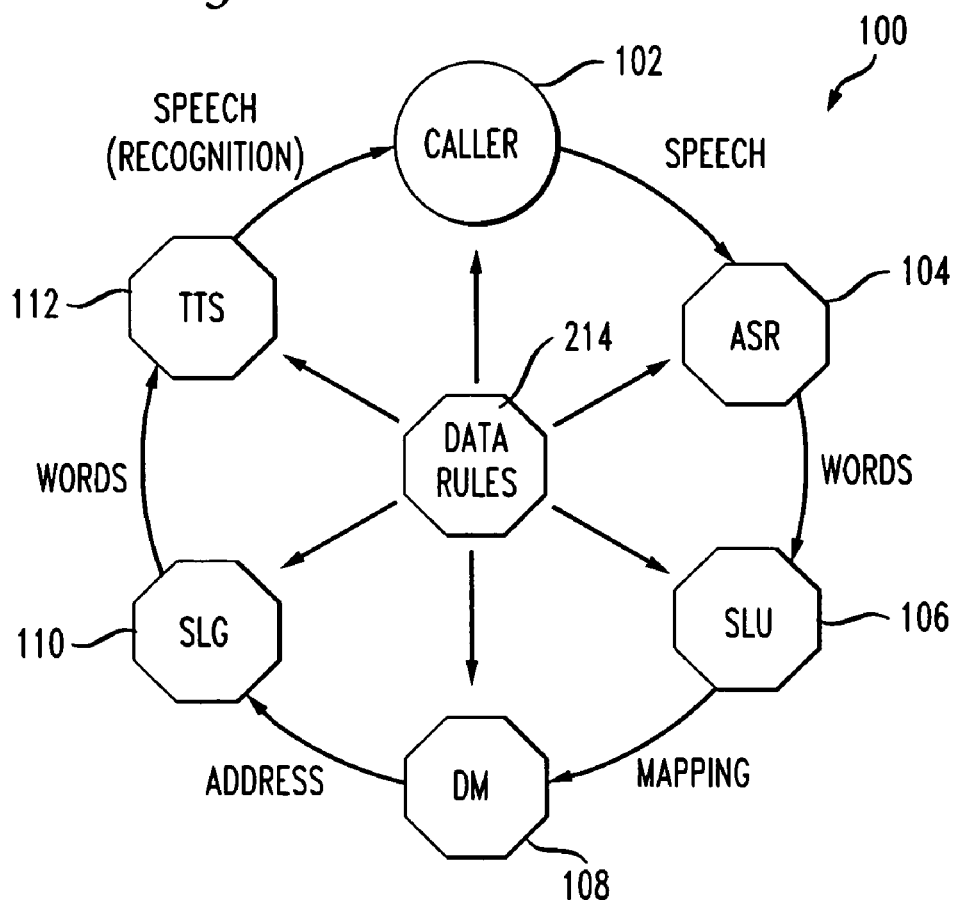
FIG. 1 illustrates a typical spoken language dialog system.

The present invention relates to improving the correct interpretation of the speaker's intent in the SLU module 106. As referenced above, often a user will not speak fluently and will have "slips of the tongue" where words are spoken that are different from the user's intent.

In speech recognition, a basic fundamental process involved relates to probability theory. When speech sounds are received, an ASR module will determine based on probability theory what text should be associated with the sounds. The details of probability theory and pattern recognition are beyond the scope of this disclosure, but details are known to those of skill in the art and may be found in such books as Huang, Acero and Hon, *Spoken Language Processing*, Prentice Hall, 2001. It is sufficient for this disclosure to understand that an ASR system will receive speech and use probability theory to seek to determine the appropriate words to assign to each utterance.

The present invention provides a method for using predictable linguistic disfluencies to augment automatic speech recognition models used in a spoken language understanding system. Further, the present invention may provide data and input to the spoken language understanding module to increase the understanding of the recognized speech. For example, it is known that many slips of the tongue are the result of a word spoken in error that is quite similar to the word the speaker "meant" to say. These words spoken in error can be identified in predictable ways. In particular, words that share 1) the initial phoneme, 2) the final phoneme, and 3) number of syllables with the "correct" intended word are quite common as a type of slip of the tongue. For example, in an telephone operator services environment, if the operator prompts the user to determine the type of call the user desires to make, the user may respond by saying "correct" or "connect" instead of what they intended to say, which is "collect."

One embodiment of the invention relates to a system for performing speech recognition. The system will preferably comprise a computing device such as a computer server operating in a stand-alone mode, in a local area network or on a wide area network such as the Internet. Any particular configuration of the computing device is immaterial to the present invention. The computing device may also operate in a wireless network and/or a wired network either as a client computing device or a server computing device. The system may involve computer processing partially on a client device and partially on a server device as well to accomplish speech recognition.

In one aspect of the invention, a the spoken dialog system, upon receiving the word "correct" when the applicant intended to say "collect" would seek to accurately recognize the input by raising or modifying the probabilities of close relatives of the word recognized based on the similarity according to the characteristics described. In this manner, for the telephone operator domain, a set of predictable erroneous responses would be identified and a modification in the probabilities of the appropriate words is achieved. The modification of probabilities may be an increase and some or all probability parameters or may be a decrease in some or all of the parameters. The modification may also increase some and decrease other probability parameters associated with speech recognition. In most cases, the probability is increased but the invention covers all these alternative ways of modifying the parameters. Therefore, the probability of the word "collect" is increased in the operator domain to increase the chance that the ASR module will interpret "correct" as "collect." Such a modification will increase the correct interpretation of user input and increase user satisfaction with the system.

Similarly, slips of the tongue often involve two or more words in a phrase with beginning or ending or words interposed. This invention also provides methods for potentially correcting these slips of the tongue. Another aspect of this invention is to understand slips of the tongue of people who are not native English speakers, including situations where words of different languages are mixed with words in English. The invention also makes use of existing corpora of slips of the tongue, as well as future database of slips of the tongue that may be collected by analyzing the actual interaction of callers with systems. The corpora may be based on specific domains such as dialogs related to handling collect calls or customer care related to a telephone service, or any other domain. The corpora may also be based on different languages. For example, if a native Japanese speaker commonly mis-states specific words when speaking English, then an English ASR system can utilize a corpora of Japanese speaker slips and utilize that corpora when adjusting the probabilities of potential recognitions based on the common slips. A similar process of adjusting probabilities may occur for speakers of different dialects of English. For example, a person with a New York accent or a southern accent may have particular words that they are more likely to mis-state and the probabilities associated with those words may be modified to improve recognition.

The corpora of data may provide, for example, increased probabilities for the predictable error words spoken in a particular domain or for a particular cultural or language domain. Therefore, if the system determines that the person communicating with the system is Japanese, then the Japanese language corpora may be loaded that identifies predictable error speech and increases the probabilities of certain words or phrases or sentences to increase the probability that the correct word or phrase will be recognized.

Figure 2:
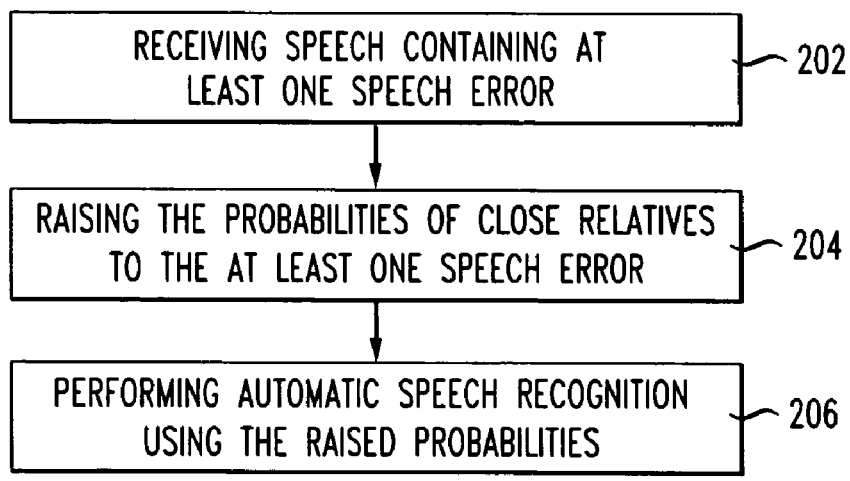
FIG. 2 illustrates a method according to an aspect of the present invention.

FIG. 2 illustrates the basic steps of the invention. They may be practiced on any computing device used to perform ASR or SLU. There is no specific programming language required to practice the invention. The method comprises receiving user speech containing at least one speech error such as a slip (202). The system raises the probabilities of close relatives of the at least one speech error (204). The ASR step then involves recognizing the speech using the raised or modified probabilities in the ASR module (206). As mentioned above, step (206) may also involve performing spoken language understanding based on the raised probabilities of certain word or phrases as set forth herein.

There are variations on the present invention. For example, the system may lower probabilities of certain based on words that a Japanese speaker rarely slips on. There may also be a particular step in the process that identifies which adjusted corpora are to be applied to the dialog. In other words, there may be an additional step of identifying a cultural corpora database based on an initial portion of a dialog in which the Japanese or Spanish or other type of corpora is applied to the dialog to improve the speech recognition with that particular person. This invention will improve the performance of systems such as AT&T's "How May I Help You" system and related systems being developed.

In another aspect of the invention, the system provides a learning mode which operates to make probabilities adjustments based on an ongoing conversation between a user and the system. In this embodiment, as the system receives speech input and makes its inferences and evaluations during speech recognition, the system determines whether it is interpreting the speech correctly. This step may occur by asking for a confirmation of the recognition. For example, "did you say Washington, D.C.?". Other methods of determining the accuracy of the recognition are also contemplated such as other actions taken by the user when interacting with the system. Based on the assessment of the accuracy of the speech recognition in an ongoing dialog, the system modifies the probabilities to improve the recognition accuracy. Using this learning mode, the system can adjust its recognition accuracy on a person by person basis as one particular person may more often articulate specific speech errors than another person.

Another linguistic problem that the present invention addresses relates to "spoonerisms". When a person speaks a "spoonerism", letters become interchanged in a phrase. For example, if a caller is making an insurance claim, he or she may say "I need to report a clammage dame." In one aspect of the invention, the system modifies the word recognition probabilities of well-known or anticipated spoonerisms and unpacks to spoonerism to reveal the user intention rather than the slip. This cognitive repair work may be performed to improve recognition.

An understanding of errors in speech may be found in literature such as Fromkin, V. A., *Errors in Linguistic Performance: Slips of the Tongue, Ear, Pen and Hand*, New York, Academic Press (1980) and Fromkin, V. A., *Speech Errors as Linguistic Evidence*, The Hague: Mouton (1981), the contents of which are incorporated herein by reference. Other references are available to those of skill in the art that outline that various collections of slips of the tongue and spoonerisms in various languages.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, other types of corpora may be developed to correct for slips. Such corpora may include different dialects, speech impediments, children's language characteristics, words that rhyme, etc. It is further appreciated that while increasing the probabilities of certain words or phrases will help the ASR module and SLU modules, such information may also be used by other modules in the spoken dialog system to increase their operation. Accordingly, the appended claims and their legal equivalents should only define the invention, rather than any specific examples given.

We claim:

1. A method of performing automatic speech recognition, the method comprising:
   determining whether a user's utterances relate to one of a plurality of corpora of data having modified probabilities of certain words;
   if the user's utterances relate to one of the plurality of corpora of data, selecting the related corpora of data for use in speech recognition;
   receiving speech from a user, the speech including at least one speech error; and
   using the selected corpora of data having modified the probabilities to process the received speech to increase the probability of correctly interpreting the received speech with the at least one speech error.

2. The method of claim 1, wherein the words having modified probabilities in the corpora of data include words that begin and end with the same phoneme and that have the same number of syllables as the at least one speech error.

3. The method of claim 1, wherein the speech error comprises a plurality of error words, and the corpora of data relates to pluralities of words that are closely related in sound to the plurality of error words.

4. The method of claim 1, wherein using the selected corpora of data having modified the probabilities to process the received speech further comprises performing automatic speech recognition on the received speech.

5. The method of claim 1, wherein using the selected corpora of data having increased the probabilities to process the received speech further comprises performing spoken language understanding on the received speech.

* * * * *